United States Patent [19]
Valliath et al.

[11] Patent Number: 5,629,785
[45] Date of Patent: May 13, 1997

[54] POLYMER DISPERSED LIQUID CRYSTAL DISPLAY DEVICE WITH ASYMMETRIC OPTICAL DIFFUSER

[75] Inventors: George T. Valliath, Buffalo Grove; Kevin W. Jelley, La Grange Park; Alan G. Chen, Schaumburg, all of Ill.

[73] Assignee: Motorola, Inc., Schaumburg, Ill.

[21] Appl. No.: 434,876

[22] Filed: May 4, 1995

[51] Int. Cl.⁶ .................... G02F 1/1333; G02F 1/1335
[52] U.S. Cl. ........................................ 349/86; 349/112
[58] Field of Search ........................ 359/69, 51, 67

[56] References Cited

U.S. PATENT DOCUMENTS

| | | | |
|---|---|---|---|
| 4,824,216 | 4/1989 | Perbet et al. | 359/69 |
| 4,832,458 | 5/1989 | Fergason et al. | 359/51 |
| 4,936,659 | 6/1990 | Anderson et al. | 359/69 |
| 5,353,133 | 10/1994 | Bernkopf | 359/51 |
| 5,420,706 | 5/1995 | Yamazaki et al. | 359/51 |
| 5,434,688 | 7/1995 | Saitoh et al. | 359/51 |
| 5,473,454 | 12/1995 | Blanchard | 359/69 |

FOREIGN PATENT DOCUMENTS

| | | | |
|---|---|---|---|
| 3-150538 | 6/1991 | Japan | 359/69 |
| 5-196927 | 8/1993 | Japan | 359/69 |
| 6-160831 | 6/1994 | Japan | 359/69 |

OTHER PUBLICATIONS

Doane, J.W. et al. "Polymer Dispersed Liquid Crystals for Display Application," *Mol. Cryst. Liq. Cryst.* (1985) vol. 165, ppl. 511–532.

Vance, D.W. "Novel High–Resolution Ambient–Light–Rejecting Rear–Projection Screen," *SID 94 Digest* (1994) pp. 741–744.

*Primary Examiner*—Anita Pellman Gross
*Attorney, Agent, or Firm*—Douglas D. Fekete

[57] ABSTRACT

A display device comprises a polymer dispersed liquid crystal film that includes one or more translucent regions and one or more transparent regions. The back side of the polymer dispersed liquid crystal film is illuminated by collimated light. The front side of the polymer dispersed liquid crystal film is optically coupled to an asymmetric optical diffuser. The asymmetric optical diffuser comprises a plurality of light paths that transmit collimated light emanating through a transparent region of the film, but excludes diffuse light emanating from a translucent region. A preferred asymmetric optical diffuser comprises glass microspheres in a black matrix. In this manner, the asymmetric diffuser substantially improves contrast between a transparent region and a translucent region of a display.

3 Claims, 1 Drawing Sheet

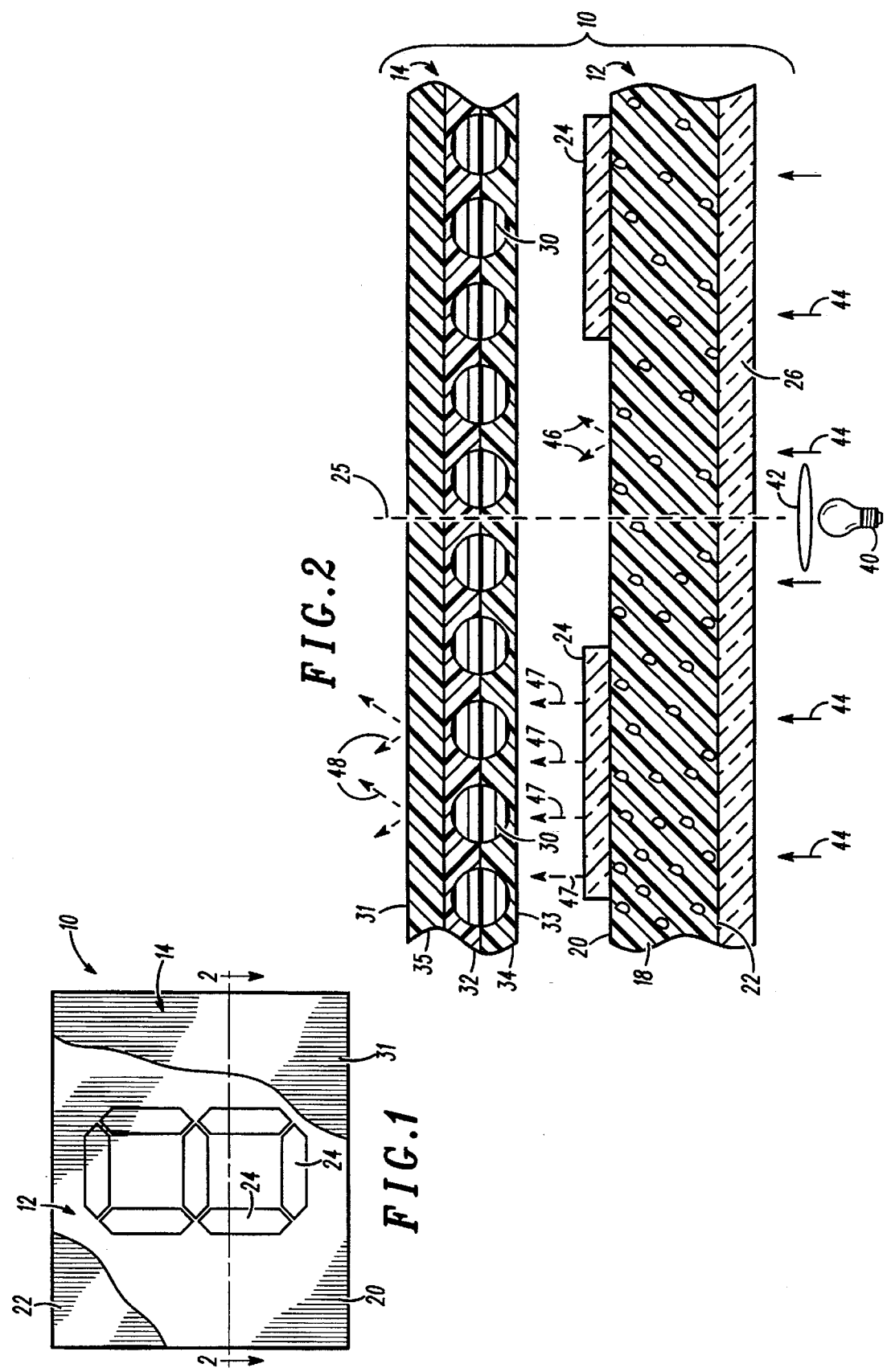

POLYMER DISPERSED LIQUID CRYSTAL DISPLAY DEVICE WITH ASYMMETRIC OPTICAL DIFFUSER

BACKGROUND OF THE INVENTION

This invention relates to a display device comprising a polymer dispersed liquid crystal film. More particularly, this invention relates to such display device wherein the polymer dispersed liquid crystal film is optically coupled to an asymmetric optical diffuser to enhance contrast in the display.

A polymer dispersed liquid crystal film, also referred to as a PDLC film, comprises microdroplets of a liquid crystal material dispersed within a transparent polymeric matrix. Transparent electrodes are applied to opposite surfaces of the film. In the absence of an electric field, the liquid crystal microdroplets diffuse light, so that the film is translucent. However, an electric field applied between the electrodes orients the liquid crystal molecules to allow the film to transmit light without diffusion, so that the film becomes transparent.

It has been proposed to utilize PDLC film in forming a display. This is accomplished by patterning at least one electrode to switch a selected region of the film from the translucent condition to the transparent condition. However, displays formed with PDLC film suffer from poor contrast. This is attributed to light randomly scattered toward the viewer from translucent regions adjacent to a transparent region. This poor contrast limits image resolution, particularly in small displays. Thus, there remains a need to enhance contrast in PDLC displays.

SUMMARY OF THE INVENTION

This invention contemplates a display device that comprises a polymer dispersed liquid crystal film and exhibits enhanced contrast regions of a display. The polymer dispersed liquid crystal film comprises a front side for viewing a display and a back side that is illuminated by collimated light. In accordance with this invention, an asymmetric optical diffuser is optically coupled to the front side of the polymer dispersed liquid crystal film. The asymmetric optical diffuser comprises a plurality of light paths for transmitting collimated light emanating through a transparent region of the film, but excludes diffuse light emanating from a translucent region. In this manner, the asymmetric diffuser substantially improves contrast between a bright area of a display, formed by a transparent region of the polymer dispersed liquid crystal film, and a dark area of the display, formed by a translucent region of the polymer dispersed liquid crystal film.

DESCRIPTION OF THE DRAWINGS

The present invention will be further illustrated with reference to the accompany drawings wherein:

FIG. 1 is a plan view, partially cut away, of a PDLC display device in accordance with this invention; and FIG. 2 is a cross-sectional view of the PDLC display device in FIG. 1, taken along lines 2—2 in the direction of the arrows.

DETAILED DESCRIPTION OF A PREFERRED EMBODIMENT

Referring to FIGS. 1 and 2, a display device 10 in accordance with a preferred embodiment of this invention comprises a polymer dispersed liquid crystal (PDLC) film 12 optically coupled to an asymmetric optical diffuser 14.

PDLC film 12 comprises a plurality of microdroplets 16 composed of a liquid crystal material and dispersed in a transparent polymeric matrix 18. A suitable liquid crystal material is composed of a twisted nematic compound. Matrix 18 is suitably formed of polymethyl methacrylate resin. A preferred PDLC film is commercially available from Raychem Corporation under the trade designation NCAP. It is a feature of the PDLC film that the twisted nematic compound of the microdroplets 16 in the absence of an applied electric field, referred to as the non-field condition, exhibits an index of refraction distinct from the index of refraction of the surrounding matrix 18, so that light propagating through the matrix is refracted at the interface of the microdroplets, thereby scattering the light. However, alignment of the twisted nematic molecules by an applied electric field, referred to as the field condition, alters the index of refraction to substantially correspond to the surrounding matrix, thereby permitting light to propagate through the film unrefracted.

PDLC film 12 has a front side 20 adapted to face an observer for viewing a display, and a back side 22 opposite front side 20. Sides 20 and 22 are generally planar and perpendicular to an axis 25. A front electrode 24 is affixed to front surface 20 and is formed of a transparent, electrically conductive material, such as indium tin oxide. Electrode 24 is patterned to create a desired display. By way of an example, FIG. 1 depicts seven electrodes 24 arranged in a familiar figure "8" design. During use, an electrical potential is selectively applied to individual electrodes 24 through leads (not shown) to create alphanumeric characters. A counter electrode 26, also formed of transparent indium tin oxide material, is affixed to back side 22.

In accordance with this invention, asymmetric optical diffuser 14 features a front surface 31 that faces an observer for viewing a display and a back surface 33 that faces PDLC side 20 for receiving light emanating from the PDLC film. In this preferred embodiment, asymmetric diffuser 14 comprises an array of glass microspheres 30 having a diameter of about 100 microns. Glass microspheres 30 are disposed in a light-absorbing matrix 32 that is formed of a black polymeric material that absorbs incident light. The black matrix with the microspheres is interposed between transparent polymeric layers 34 and 35. A suitable asymmetric diffuser 14 is commercially available from Jenmar Visual Systems Company under the trade designation of Jenmar Blackscreen. Diffuser 14 is arranged with PDLC film 12 so that surfaces 31 and 33 are generally perpendicular to axis 25, i.e., parallel to PDLC front side 20. Within the asymmetric diffuser, microspheres 30 form a plurality of light paths through the light-absorbing matrix 32. Light emanating from PDLC surface 20 is admitted to diffuser 14 through transparent layer 34 that faces the surface. Axial incident light rays that are intercepted by microspheres 30 are transmitted through the otherwise black matrix. Because layer 34 is transparent, layer 34 maximizes exposure of the microspheres to the light admitted through the back surface and thereby increases the proportion of coaxial light transmitted through the light paths formed by the microspheres. In addition, the microspheres concurrently refract the light, so that the light emitted from surface 31 is diffused. Any incident light rays, whether coaxial or otherwise, that are directed between the microspheres is intercepted by the matrix and absorbed. More significantly, light rays that are intercepted by the microspheres, but travel in a direction nonparallel to axis 25 are transmitted through the microspheres into the matrix and also absorbed. Thus, the light paths formed by microspheres 30 preferentially transmit incident light that is parallel to axis 25, but exclude light that is not parallel, i.e., at acute angles to axis 25.

Display device 10 is illuminated by a electrical backlight source 40 coupled to a collimating lens 42. The resulting collimating light beam, indicated by arrows 44, is parallel to axis 25 and illuminates back surface 22 of PDLC film 12 through transparent electrode 26.

During use, in the absence of an electric field applied to PDLC film 12, the light of collimated beam 44 is scattered by liquid crystal microdroplets 16 within PDLC film 12. This light scattering is attributed to a difference between the index of refraction of the liquid crystal material in the non-field condition and the index of refraction of the surrounding polymeric material. Moreover, within film 12, individual light rays may be scattered by multiple microdroplets. As a result, a portion of the light emanates from front surface 20, but is diffuse, as indicated by arrows 46, in contrast to the original collimated beam. As used herein, diffuse light refers to light wherein the light rays emanate in multiple directions. Although, because the random nature of scattering, the diffuse light may include light parallel to axis 25, such axial portion of the light is negligible, so that the diffuse light is substantially composed of light emitted at acute angles to axis 25. Asymmetric diffuser 14 substantially filters out the diffuse light rays. The area of the display thus appears dark, which darkness is enhanced by the black color of layer 32 that absorbs ambient light illuminating front surface 31 of the display device. To create an image for display, an electrical potential is applied between electrode 24 and back electrode 26, through the intermediate region of the PDLC film 12, to align the liquid crystal material within microdroplets 16, which alters the index of refraction to correspond to the index of refraction of the surrounding matrix material. As a result, the intermediate region becomes transparent. Thus, collimating light 44 passes through PDLC film 12 with minimal loss due to scattering, emitting axial light as indicated by arrows 47. The light passes through transparent electrode 24 and thereafter through the light paths formed to by glass spheres 30 in asymmetric diffuser 14. The resultant light emanating from the region, as indicated by arrows 48, produces a bright area for the display. Moreover, the light emanating from surface 31 is diffused by asymmetric diffuser 14. Thus, the resulting display is not limited to viewing along axis 25, the direction of the incident collimated light, but may be suitably viewed over an extended range of viewing angles corresponding to the diffuse light emanating from the light paths formed by the microspheres.

Therefore, this invention provides a display device that utilizes a polymer dispersed liquid crystal film to create bright and dark areas that form an image for a display. Because of the polymeric matrix, the PDLC film exhibits increased integrity to facilitate handling during processing and enhances durability of the product display, particularly in comparison to liquid crystal display devices that employ a liquid layer of liquid crystal material sandwiched between transparent plates and polarizers. Electrodes may be formed directly on surfaces of the PDLC film, thereby minimizing the number of components needed in creating the display. The display is formed by translucent and transparent regions of the PDLC film, which, if viewed directly by an observer, would differ in apparent brightness and provide a subtle distinction between areas. However, it is a significant advantage of this invention that the areas of the display appear as black or bright and provide a dramatic differentiation that is readily perceived by the observer. This is attributed to the asymmetric optical diffuser that transmits collimated light that is transmitted through the transparent regions of the PDLC film, but excludes diffuse light from other, i.e., translucent regions. The device is thus well suited for forming a display featuring prominent, bright characters dramatically offset against a black background. Moreover, by eliminating light from adjacent transparent regions, the asymmetric diffuser enhances resolution between the bright and dark areas. Thus, this invention combines the advantages of a polymer dispersed liquid crystal film while producing a high contrast, sharp display.

In the described embodiment, the asymmetric optical diffuser comprises a series of glass microspheres that form light paths for transmitting collimated light, while filtering diffused light. Alternately, a suitable asymmetric diffuser may be formed by a plurality of pinholes in a light absorbing, e.g., black film. The pinholes may be sized and shaped to transmit light a narrow path corresponding to the axis of the collimated beam, while absorbing light attempting to propagate through at acute angles, and further to diffract the collimated light, thereby extending the viewing range for the display.

While this invention has been described in terms of certain embodiments thereof, it is not intended that it be limited to the above description, but rather only to the extend set forth in the claims that follows.

The embodiments of the invention in which an inclusive property is claimed are defined as follows:

1. A display device comprising
   a polymer dispersed liquid crystal film comprising a transparent polymeric matrix and microdroplets containing a liquid crystal material dispersed within the transparent polymeric matrix, said polymer dispersed liquid crystal film having a front side adapted for emitting light for viewing a display and a back side opposite the front side,
   a collimated light source illuminating the back side of the polymer dispersed liquid crystal film, and
   an asymmetric optical diffuser optically coupled to the front side of the polymer dispersed liquid crystal film to receive light emitted therefrom, said asymmetric optical diffuser comprising a plurality of light paths that transmit collimated light transmitted through the polymer dispersed liquid crystal film and exclude diffuse light emanating from the polymer dispersed liquid crystal film nonparallel to the collimated light.

2. A display device comprising
   a polymer dispersed liquid crystal film comprising a transparent polymeric matrix and microdroplets containing a liquid crystal material dispersed within the transparent polymeric matrix, said polymer dispersed liquid crystal film having a front side wherefrom light emanates for forming a display and a back side opposite the front side, said polymer dispersed liquid crystal film further comprising at least one region switchable in response to an applied electric field between a translucent condition and a transparent condition,
   a collimated light source for producing a collimated light beam that illuminates the back side of the polymer dispersed liquid crystal film along an axis generally perpendicular to said back side, and an asymmetric optical diffuser optically coupled to the front side of the polymer dispersed liquid crystal film to receive light emanating therefrom, said asymmetric optical diffuser comprising an opaque matrix and a plurality of transparent microspheres arranged in the opaque matrix to form light paths through the asymmetric optical diffuser that selectively transmit collimated light along the axis, whereby collimated light transmitted through the region in the transparent condition is transmitted through the asymmetric optical diffuser to create a bright area for a display and diffuse light emanating from the region in the translucent condition in directions nonparallel to the axis are excluded to create a dark area for a display.

3. A display device in accordance with claim 2 further comprising first and second transparent electrodes affixed respectively to the front side and the back side of the polymer dispersed liquid crystal film and adapted for coupling to a remote electrical power source for applying an electric field to switch said region between the translucent condition and the transparent condition.

* * * * *